Sept. 6, 1955  R. LUCIEN  2,717,002
THREE-WAY DISTRIBUTOR
Filed Aug. 13, 1952
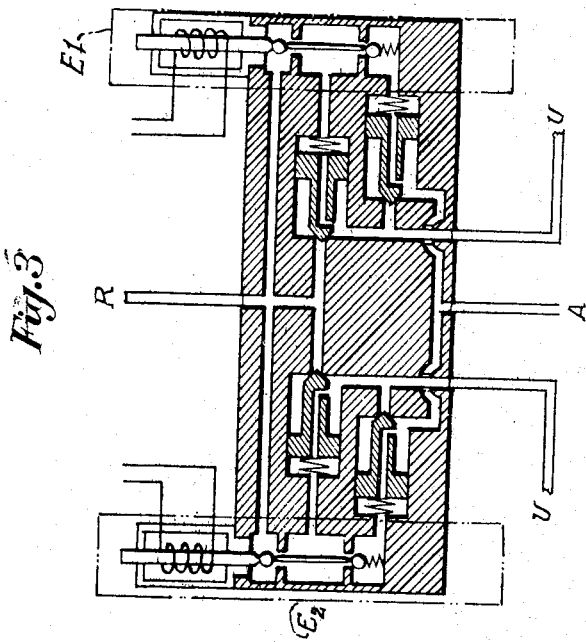
Fig.3
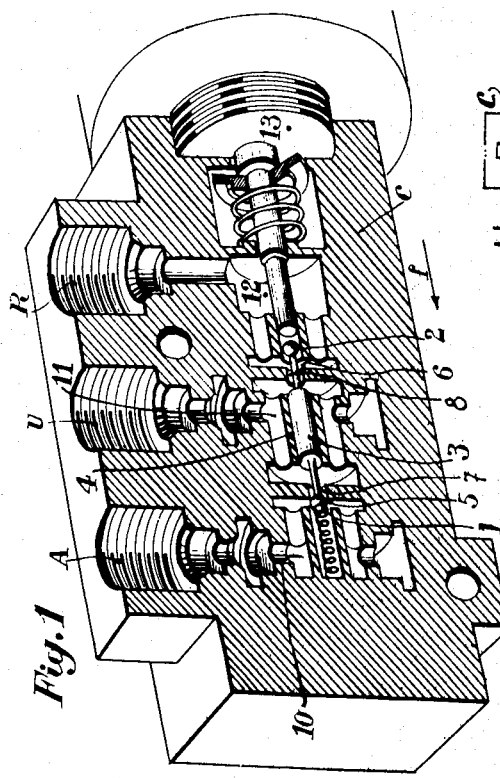
Fig.1
Fig.2
INVENTOR
RENE LUCIEN
By:
Haseltine, Lake & Co.
AGENTS United States Patent Office 2,717,002
Patented Sept. 6, 1955

2,717,002

THREE-WAY DISTRIBUTOR

Rene Lucien, Paris, France, assignor to Societe d'Inventions Aeronautiques et Mecaniques S. I. A. M., Fribourg, Switzerland, a corporation of Switzerland Application August 13, 1952, Serial No. 304,075

Claims priority, application France February 14, 1952

2 Claims. (Cl. 137—620)

The present invention refers to hydraulic distributors of the type of those which are usually provided at the junction of a plurality of ducts leading to or from hydraulic units, such as hydraulically-powered devices or sources of hydraulic pressure energy, in order to be able to put these ducts into communication in any predetermined manner.

In many cases there are three ducts connected to the distributor, one to supply liquid under pressure to the distributor, a second connecting the distributor to some hydraulically-operated device, and a third for the exhaust of liquid under pressure towards a reservoir or the like.

The invention has for its object to provide improved means for putting the line leading towards the hydraulically-operated device in communication with the supply line and with the exhaust line alternately. According to the present day practice this is achieved by means of hydraulic distributors which ensure that opening of the pressure supply line is always preceded by closing of the exhaust line, and opening of the exhaust line is always preceded by closing of the pressure supply line.

This arrangement, while it provides the advantage of completely eliminating any possibility of intercommunication between the pressure supply line and the exhaust line, is disadvantageous in that it is relatively complex and entails the use of two valves. Furthermore, the fact that the operation of such distributors takes place in two distinct and successive phases is a great inconvenience when extremely rapid operation of hydraulic actuators is desired, for instance in the case of apparatuses where movements must be of very small amplitude to provide the desired velocity and precision in operation.

The present invention thus has for its object a three-way distributor, which is of very simple construction, which comprises very few component elements, and which is extremely rapid in response to control movements.

In the distributor according to the present invention, those results are obtained by substituting for the known arrangement of separate valves a unit comprising two rigidly connected valves, aligned one with respect to another. These valves move as a unit and their displacement serves to control the alternate opening and closing of the pressure supply and exhaust lines.

According to an important feature of the distributor according to the invention the closing of the exhaust valve, during the intervals in which liquid under pressure is supplied to the hydraulically-operated device controlled by the distributor, is effected, not by the pressure of the liquid itself as in known distributors, but by the positive action of the distributor control-member. This control member may for example be operated by an electro-magnet, or by any other suitable means, such as a mechanical, hydraulic, or pneumatic system.

The construction of the distributor according to the invention is such that for an interval, which may be very brief, the two valves are open simultaneously, but as the section of the valve openings is very small the momentary leakages thereby created are negligible and the forces brought into play are extremely small.

Because of this arrangement the distributor according to the invention may not be used where a large hydraulic flow is required. Consequently, except for the case of the transmission of hydraulic signals, the field of use of the distributor according to the invention is practically restricted to the controlling of the operations of conventional hydraulic distributors of greater output.

Certain arrangements whereby conventional hydraulic distributors, having a large output, may be controlled by a distributor according to the invention, will be described herein later and are included in the scope of the invention.

The invention is illustrated by way of example in the accompanying drawings, wherein:

Figure 1 is a perspective view in longitudinal section of a three-way hydraulic distributor according to the invention;

Figure 2 shows diagrammatically an arrangement for the control of a conventional distributor, having a large output, by means of a three-way distributor according to the invention;

Figure 3 shows diagrammatically an arrangement for the control of a four-way distributor of the conventional type, having a large output, by means of twin distributors in accordance with the invention.

Referring firstly to Figure 1:

In the body C of the distributor—having the usual pipe connections, A for the supply of liquid under pressure, U for communication with some hydraulically-controlled apparatus, and R for exhaust, there is mounted a pair of valves 1, 2 in line with one another, for admission and exhaust of pressure liquid respectively. These valves are connected by a sliding rod 3 movable in a guide 4.

The respective seats 5 and 6 of valves 1, 2 are constituted by the outer ends of orifices 7, 8 of very small diameter, provided in partition walls which divide the chamber defined inside the distributor into three compartments 10, 11, 12.

The double valve assembly is arranged to be moved in one direction, that is in the direction of the arrow f, by any convenient device suitable for the purpose, and in the example illustrated by means of an electro-magnet 13.

Liquid-tight closure of the admission valve 1 is achieved in the standard manner, that is, it is ensured by the pressure on the valve of the liquid supplied through the connection A.

The arrangement of the exhaust valve 2, however, differs from the usual one, in that liquid-tight closure of the valve is ensured, not by liquid pressure, but by the positive action of the control member, i. e. in this case of the electro-magnet 13, the force exerted by which is for this purpose definitely greater than the force provided merely by the liquid pressure.

Since the distance between the valves 1, 2 is necessarily greater than that between their respective seats 7, 8, the valves, which move as a unit, are necessarily open simultaneously for a part of the time of each control stroke. This situation provides the advantage that the changes in pressure which these control movements cause in the output line connected at U take place without shock. Besides, the leakages between the supply and exhaust lines A and R are negligible in view of the very small diameter of the orifices 7, 8 and also the very small amplitude of the stroke of the valves.

By means of this arrangement, owing to the unitary structure of the coupled valves, an electro-magnet of very small dimensions and of rudimentary construction may be used to operate a three-way distributor, with a very small amount of inertia.

While the leakage between the supply and exhaust lines A and R is negligible because of the very small section of the orifices 7 and 8, the fact that these sections are small practically prevents the use of the arrangement where a large liquid delivery is required. The device according to the invention is therefore to be utilized as a pilot distributor for controlling distributors of conventional type capable of having a larger output.

Referring now to Figure 2, it may be seen that the body C of a three-way distributor according to the invention, which in the embodiment shown is used as a pilot distributor, is provided as in the above case, with supply, output and exhaust connections A, U and R. Within chambers 16, 17, located in the supply and output ducts A and U respectively, are provided valves 14, 15, the respective seats of which are constituted by the ends of conduits 18, 19 which are of large section. Conduit 18 serves to connect the supply duct A with the output duct U, and the conduit 19 serves to connect the output duct U with the exhaust duct R.

In the valves 14, 15 are respectively provided calibrated orifices 20, 21, the orifice 20 providing communication between the chamber 16 and the compartment 10 of the distributor according to the invention, and the orifice 21 affording communication between chamber 17 and compartment 11. These orifices are calibrated in such manner that they permit a flow of liquid smaller than that through the orifices 7, 8 of the distributor.

When, under the action of the electro-magnet 13, the valve 2 is closed, the exhaust line R is isolated because the valve 15, under the action of a return spring 23, closes the end opening of the conduit 19, the pressures in the chamber 17 and compartment 11 being then equal. If the electro-magnet is de-energized, the valve 2 opens under the effect of liquid pressure. The flow of liquid through the orifice 8 being greater than that through the calibrated orifice 21, the pressure in the compartment 11 is of necessity less than that in the chamber 17 and therefore the valve 15 opens in its turn under the effect of liquid pressure. The output line U is then directly connected to the exhaust line R through the large section duct 19.

While during the above-described interval the valve 2 is open, the valve 1 is closed, and the supply line A is isolated because the pressures prevailing in the compartment 10 and the chamber 16 are equal, and the valve 14 is held against its seat by a spring 22.

When, under the action of the electro-magnet 13, the valve 1 opens, the flow of liquid through the orifice 7 is greater than that passing through the calibrated orifice 20, so that pressure decreases in the compartment 10 and the valve 14 opens in its turn under the action of the pressure prevailing in the chamber 16. The supply line A feed then directly the output line U through the large section duct 13.

During this phase, as a result of the fact that the valve 1 is open and the valve 2 closed, the exhaust line R is put out of circuit because, as described above, such is the effect of closing of the valve 2.

Figure 3 shows a double acting arrangement in which four valves are controlled.

Two sets of conventional distributors controlled in accordance with Figure 2 are coupled in such manner as to give two liquid output lines; each of the distributors $E^1$ and $E^2$ controls a group of two valves. The twin exhaust lines, respectively relative to the two groups, merge to form a single exhaust line R; similarly, the supply line A is bifurcated to form two supply lines.

Thus multiple distributor systems can be built up, in association with a plurality of excitation units according to the invention each constructed from simple parts in the manner of the three-way distributor described, whereby the control of distributors having a whole range of liquid outputs can be arranged.

I claim:

1. The combination, in a single body member, comprising a three-way hydraulic distributor including a body member having a supply duct, a discharge duct and an output duct therein and comprising apertured walls in said body member defining a central one and two outlying aligned chambers respectively connected to said ducts, a guide inside said central chamber, a piston slidable in said guide, valve stems secured to each end of said piston, valve heads on said stems positioned to seat on said apertured walls in said outlying chambers, a spring urging said piston in one direction, actuating means comprising a plunger positioned to act upon said piston in opposition to said spring, and a return spring positioned to act in opposition to actuating movement of said plunger; and a further hydraulic distributor of greater output comprising, in said body member, three ducts respectively for supply, output and discharge common to said three-way hydraulic distributor and said further hydraulic distributor, means in said output duct defining a first chamber, a first piston slidable in said first chamber and having a channel therethrough communicating with the two spaces defined by said piston in said first chamber, a first communication duct between said supply and output ducts, said first piston having valve means thereon for closing said first communication duct, a spring urging said first piston and valve means into closing position, means in said supply duct defining a second chamber, a second piston slidable in said second chamber and having a channel therethrough communicating with the two spaces defined by said second piston in said second chamber, a second communication duct between said supply and discharge ducts, said second piston having valve means thereon for closing said second communication duct, a spring urging said second piston and valve means into closing position, the cross-section of flow of said channels being less than the useful cross-section of flow of the apertures in said walls.

2. Means coupling together two combinations as claimed in claim 1 comprising, in said single body member, a common supply duct connected to each supply duct, a common discharge duct connected to each supply duct, and two separate output ducts adapted for connection to separate loads.

References Cited in the file of this patent
UNITED STATES PATENTS

| | | |
|---|---|---|
| 1,281,543 | Farmer | Oct. 15, 1918 |
| 2,101,316 | Kettnich | Dec. 7, 1937 |
| 2,200,830 | Beharrell | May 14, 1940 |

FOREIGN PATENTS

| | | |
|---|---|---|
| 638,238 | Germany | 1936 |